US008560321B1

(12) United States Patent
Yeracaris et al.

(10) Patent No.: US 8,560,321 B1
(45) Date of Patent: Oct. 15, 2013

(54) AUTOMATED SPEECH RECOGNITION SYSTEM FOR NATURAL LANGUAGE UNDERSTANDING

(75) Inventors: Yoryos Yeracaris, Boston, MA (US); Philip M. Gray, Highland Park, IL (US); James P. Dreher, Carmel, IN (US)

(73) Assignee: Interactions Corportion, Franklin, MA (US)

( * ) Notice: Subject to any disclaimer, the term of this patent is extended or adjusted under 35 U.S.C. 154(b) by 408 days.

(21) Appl. No.: 12/985,174

(22) Filed: Jan. 5, 2011

(51) Int. Cl.
*G10L 15/30* (2013.01)

(52) U.S. Cl.
USPC ...................................... 704/270.1

(58) Field of Classification Search
USPC ........................................ 704/270
See application file for complete search history.

(56) References Cited

U.S. PATENT DOCUMENTS

| | | | |
|---|---|---|---|
| 5,033,088 A | 7/1991 | Shipman | |
| 5,199,062 A | 3/1993 | Von Meister et al. | |
| 5,740,240 A | 4/1998 | Jolissaint | |
| 5,987,116 A | 11/1999 | Petrunka et al. | |
| 6,411,686 B1 | 6/2002 | Porter et al. | |
| 6,499,013 B1 | 12/2002 | Weber | |
| 7,412,260 B2 * | 8/2008 | Gailey et al. | 455/563 |
| 7,480,619 B1 * | 1/2009 | Scott | 704/275 |
| 7,487,095 B2 | 2/2009 | Hill et al. | |
| 7,606,714 B2 | 10/2009 | Williams et al. | |
| 8,332,231 B2 * | 12/2012 | Cloran | 705/1.1 |
| 8,484,031 B1 * | 7/2013 | Yeracaris et al. | 704/270.1 |
| 8,484,042 B2 * | 7/2013 | Cloran | 705/1.1 |
| 2003/0179876 A1 | 9/2003 | Fox et al. | |
| 2003/0185380 A1 | 10/2003 | Garin | |
| 2003/0215066 A1 | 11/2003 | Shambaugh et al. | |

OTHER PUBLICATIONS

Natural Vox, S.A., "TOP (Transparent Operator), SUPER (Supervisor), RCC (Reporting Call Center) and TTO (Test and Train TOP)," Jun. 18, 2010, three pages. [Online] [Retrieved Dec. 1, 2011] Retrieved from the Internet <URL:http://web.archive.org/web/20100618073925/http://natvox.es/en/tecnologia.aspx?id=4.>.

* cited by examiner

*Primary Examiner* — Susan McFadden
(74) *Attorney, Agent, or Firm* — Fenwick & West LLP

(57) ABSTRACT

An interactive response system directs input to a software-based router, which is able to intelligently respond to the input by drawing on a combination of human agents, advanced speech recognition and expert systems. The system utilizes human "intent analysts" for purposes of interpreting customer utterance. Automated speech recognition subsystems are trained by coupling utterances with IA-selected meanings for those utterances, using non-real time systems to develop the training information for the automated speech recognition subsystems.

20 Claims, 13 Drawing Sheets

Screen 1

| | |
|---|---|
| Customer Utterance: | <none> |
| Intent Captured: | <none> |
| Data Captured: | <none> |
| Pre-Recorded System Prompt or Response: | "Thank you for calling Interair! Im the new automated assistant. Just talk to me like you would to a person. How can I help you?" |

FIG. 3A

| Screen 2 | |
|---|---|
| Customer Utterance: | "I need to check my flight from Chicago to London this afternoon" |
| Intent Captured: | CFT |
| Data Captured: | Departure City: Chicago<br>Arrival City: London<br>Departure Time: Afternoon |
| Pre-Recorded System Prompt or Response: | "Flight # 921 is scheduled to depart on time at 5:15 P.M. from Chicago OHare gate M17A and arrive on time at London Heathrow at 8:15 A.M. at gate E7."<br><br>"How else can I help you today?" |

FIG. 4A

| Screen 3 | |
|---|---|
| Customer Utterance: | "Yeah, is there any food and how about some entertainment?" |
| Intent Captured: | Meal<br>Movie |
| Data Captured: | <none> |
| Pre-Recorded System Prompt or Response: | "A meal will be served during this flight."<br>"The movie Seabiscuit will be shown during your flight."<br>"What else can I do for you?" |

FIG. 5A

AUTOMATED SPEECH RECOGNITION SYSTEM FOR NATURAL LANGUAGE UNDERSTANDING

FIELD OF THE INVENTION

This invention relates to the field of interactive response communication systems, and, more particularly to an interactive response communications system that uses human interpretation of customer intent to facilitate real-time learning of an automated speech recognition (ASR) processor.

BACKGROUND OF THE INVENTION

Many companies interact with their customers via electronic means (most commonly via telephone, e-mail, and online text chat). Such electronic systems save the companies a large amount of money by limiting the number of customer service or support agents needed. These electronic systems, however, generally provide a less than satisfactory customer experience. The customer experience may be acceptable for simple transactions, but are frequently inconsistent or downright frustrating if the customer is not adept at talking to or interacting with a computer.

Such interactive response systems are well known in the art. For example, providing customer service via telephone using an interactive voice response (IVR) system is one such system. An example of customer service systems utilizing IVR technology is described in U.S. Pat. No. 6,411,686. An IVR system typically communicates with customers using a set of prerecorded phrases, responds to some spoken input and touch-tone signals, and can route or transfer calls. A drawback to such IVR systems is that they are normally built around a "menu" structure, which presents callers with just a few valid options at a time and require a narrow range of responses from callers.

Many of these IVR systems now incorporate speech recognition technology. An example of a system incorporating speech recognition technology is described in U.S. Pat. No. 6,499,013. The robustness of the speech recognition technology used by IVR systems vary, but often have a predetermined range of responses that they listen for and can understand, which limits the ability of the end user to interact with the system in everyday language. Therefore, the caller will often feel that they are being forced to speak to the system "as though they are talking to a computer." Moreover, even when interacting with a system that utilizes speech recognition, customer input is often either not recognized or incorrectly determined, causing the customer to seek a connection to a human customer service agent as soon as possible.

Human customer service agents continue to be used for more involved customer service requests. These agents may speak to the customer over the phone, respond to customer e-mails, and chat with customers online. Agents normally answer customer questions or respond to customer requests. Companies have customer service groups, which are sometimes outsourced to businesses that specialize in "customer relations management." Such businesses run centers staffed by hundreds of agents who spend their entire working day on the phone or otherwise interacting with customers. An example of such system is described in U.S. Pat. No. 5,987,116.

The typical model of customer service interaction is for one agent to assist a customer for the duration of the customer's interaction. At times, one agent (for example, a technical support representative) may transfer the customer to another agent (such as a sales representative) if the customer needs help with multiple requests. But in general, one agent spends his or her time assisting that one customer for the full duration of the customer's call or chat session, or is occupied resolving the customer's issue via e-mail. Most call centers also expect the agent to take the time to log (document) the call. Deficiencies in this heavy agent interface model is (1) there is a high agent turnover rate and (2) a great deal of initial and ongoing agent training is usually required, which all add up to making customer service a significant expense for these customer service providers.

In order to alleviate some of the expenses associated with agents, some organizations outsource their customer service needs. One trend in the United States in recent years, as high-speed fiber optic voice and data networks have proliferated, is to locate customer service centers overseas to take advantage of lower labor costs. Such outsourcing requires that the overseas customer service agents be fluent in English. In cases where these agents are used for telephone-based support, the agent's ability to understand and speak clearly in English is often an issue. An unfortunate result of off shore outsourcing is misunderstanding and a less than satisfactory customer service experience for the person seeking service.

Improved interactive response systems blend computer-implemented speech recognition with intermittent use of human agents. For example, U.S. Pat. No. 7,606,718 discloses a system in which a human agent is presented with only portions of a call requiring human interpretation of a user's utterance. The contents of U.S. Pat. No. 7,606,718 as well as all other art referred to herein is hereby incorporated by reference as is fully set forth herein. Interest in such systems is enhanced if they are relatively low in cost, which generally calls for limited human interaction. To achieve such limited human interaction, it would be desirable to have a system that required minimal initial training and for which results continued to improve over time. In particular, a learning/training system that provides "day-one" performance that is suitable for production use and that improves in efficiency quickly over time would be particularly valuable.

Many existing ASR systems suffer from serious training constraints such as the need to be trained to recognize the voice of each particular user of the system or the need to severely limit recognized vocabulary in order to provide reasonable results. Such systems are readily recognizable by users as being artificial. Consider the difference between the typical human prompt, "How can I help you?" and the artificial prompt, "Say MAKE if you want to make a reservation, STATUS if you would like to check on status of a reservation, or CANCEL to cancel a reservation."

Systems that are more ambitious, such as Natural Language Understanding (NLU) systems, require extensive machine learning periods in order to get usable results from larger grammars and vocabularies. Particularly in environments in which vocabulary may be dynamic (such as a system to take ticket orders for a new play or for a concert by a new musical group), the learning period may be far too long to provide satisfactory results. Inclusion of accents, dialects, regional differences in grammar and the like further complicate the task of teaching such systems so that they can achieve reasonable thresholds of recognition accuracy.

Therefore, there remains a need in the art for an interactive system that provides a consistently high-quality experience without the expense of a large staff of dedicated, highly trained agents or long and complicated training of constituent ASR components.

SUMMARY

An interactive response system provides training of ASR subsystems through interaction with one or more human agents. The system uses real-time ASR subsystems with accuracy above a threshold to perform recognition where possible, and also uses non-real time ASR subsystems to develop language models (e.g., grammars) for the real-time ASR subsystems. The system relies more substantially on such human interaction during an early portion of a learning period, and less as the real-time ASR subsystems become more proficient.

In one aspect, human interaction serves multiple functions: a real-time determination of the intent of a user's utterance for handling the user's request, and a learning input used to teach the associated real-time ASR subsystem(s) for accuracy improvement in the future.

In a further aspect, human intervention is also employed to assist in validating performance levels of ASR subsystems.

In yet another aspect, multiple human intent analysts (IAs) are used, both as need for load leveling and to process a request in parallel, in order to determine a level of difficulty in interpreting an utterance's intent as well as to provide a richer training set for ASR subsystems.

In still another aspect, an IA determines intent by selecting a meaning from a predetermined set of actionable items.

The selected meaning of each IA is provided, along with the corresponding utterance, as training input to one or more of the non real-time training ASRs.

It is another object of the invention to provide an interactive response system that allows for workload balancing by dynamically adjusting the amount of IA involvement in training and production. For example, in times of heavier end-user traffic, the system advantageously evaluates and executes a tradeoff between agent accuracy and availability. To effect such balancing, some components of customer input are shifted from multiple IAs to just one, and training of ASRs through IA-supplied intents is reduced. At times of lower traffic, training is increased through double, triple or quadruple checking, which also creates a steady pace of work for human agents.

Those skilled in the art will recognize that a particular configuration addressed in this disclosure can be implemented in a variety of other ways. Unless otherwise defined, all technical and scientific terms used herein have the same meaning as commonly understood by one of ordinary skill in the art to which this disclosure belongs.

The features described above may be used alone or in combination without departing from the scope of this disclosure. Other features, objects, and advantages of the systems and methods disclosed herein will be apparent from the following detailed description and figures.

BRIEF DESCRIPTION OF THE DRAWINGS

Further features of the invention, its nature and various advantages will be more apparent from the following detailed description of the preferred embodiment, taken in conjunction with the accompanying drawings, in which like reference characters refer to like parts throughout, and in which:

FIG. 3A is a chart illustrating one embodiment of a customer/interactive response system interaction in the context of FIG. 2;

FIG. 4A is a chart illustrating one embodiment of a customer/interactive response system interaction in the context of FIG. 2;

FIG. 5A is a chart illustrating one embodiment of a customer/interactive response system interaction in the context of FIG. 2;

DETAILED DESCRIPTION

Description of operation of an interactive response system is provided first, according to FIGS. 1-6, to provide context for the machine learning system and processes described thereafter. Note that unless otherwise evident, the terms "intent" and "meaning" used herein refer to the contextual reason corresponding to an utterance (for instance, having a system determine a caller's business intent to make a new flight reservation). In contrast, the term "recognize" and its derivatives is generally used herein for the process of converting a sound to its corresponding word.

Figure 1:
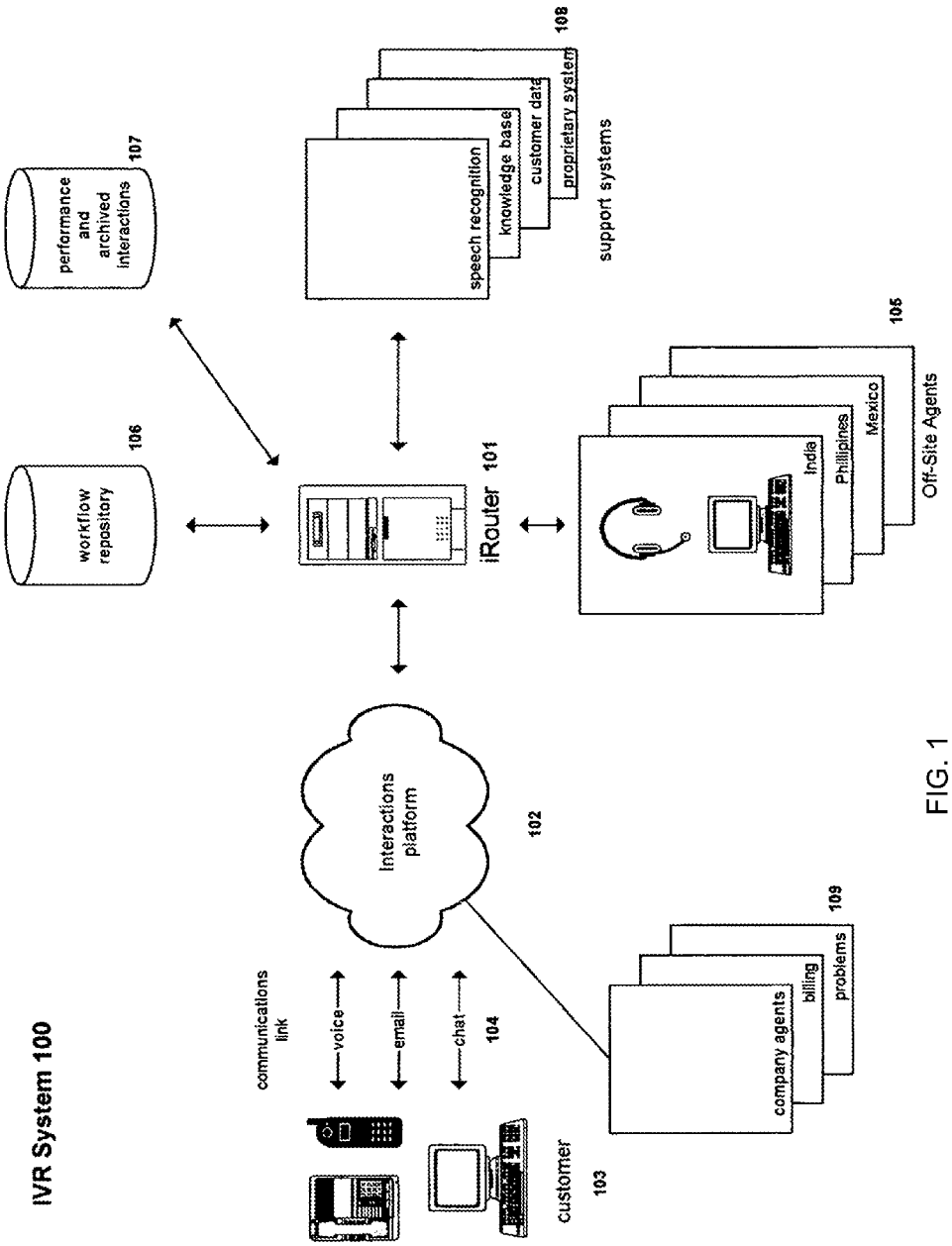
FIG. 1 is a block diagram illustrating one embodiment of an architecture of an interactive response system.

FIG. 1 illustrates one embodiment of an architecture for connecting an interactions platform 102 to an interactive response system 100 through an interactive router 101 (herein referred to as an "iRouter"). As shown in FIG. 1, interactions platform 102 is connected to a customer 103 through communications link 104. Interactions platform 102 is also connected to interactive response system 100 at iRouter 101 via a datalink, which comprises a TCP/IP data link in this exemplary embodiment. Interactions platform 102 in this exemplary embodiment comprises a computer server. The exact configuration of the computer server varies with the implementation but typically consists of a Pentium-based server running an operating system such as Windows or Linux, using a voice board from a vendor such as Dialogic. Interactions platform 102 can also be an e-mail gateway or web server. Thus, customer input enters interactive response system 100 via telephone or intercom and text is entered via email or an interactive chatting interface (e.g., a web page or a stand-alone application such as Yahoo Messenger).

In this architecture of FIG. 1, in various embodiments a number of different types of devices are used to implement each of the interactions platform 102 and communications links 104. Interactions platform 102 may be implemented by any device capable of communicating with the customer 103. For example, interactions platform 102 is in one embodiment a telephony server in interactive response system 100 where the customer is calling by telephone. The telephony server handles answering, transferring and disconnecting incoming calls. The telephony server is also a storehouse for prerecorded audio clips so that it can play any welcome prompt and as other audio clips as directed by iRouter 101.

A telephony server in accordance with this embodiment is assembled from off-the-shelf components, for example Windows for an operating system, a central processor, such as a Pentium processor, and an Intel Dialogic voice board. Using this architecture, the communications link 104 is implemented by any means of providing an interface between the customer's telephone and the telephony server. For example, communications link 104 is in various embodiments a dial-up connection or a two-way wireless communication link.

In another exemplary embodiment, interactions platform 102 is a gateway server in interactive response system 100. In accordance with this exemplary embodiment, the customer interacts with the interactive response server by e-mail, interactive text chats or VoIP. The gateway server runs customized open source e-mail, www server software or SIP. Further, a gateway server in accordance with this exemplary embodiment is designed to conduct e-mail, interactive text chat, or VoIP transactions with customers, while also forwarding and receiving data to other elements of the system. Using this architecture, the communications link 104 is implemented by any means of providing an interface between the customer's computer and the gateway server. For example, communications link 104 is in various embodiments a dedicated interface, a single network, a combination of networks, a dial-up connection or a cable modem.

While only one interactions platform 102 is illustrated in FIG. 1, one skilled in the art will appreciate that multiple interactions platforms 102 may be used in this system after studying this specification. With multiple interactions platforms 102, an interactive response system may communicate via voice and text data with a customer. Further, multiple customer bases may be accommodated by a dedicated interactions platform 102 for each of the customer bases. In this manner, a workflow (as will be described further, below) is selected by determining which of the multiple interactions platforms 102 initiated the interaction.

In the architecture of FIG. 1, the iRouter 101 comprises software to control interactive response system 100. iRouter 101 "owns" the interaction with customer 103 from beginning to end by coordinating activity among other components and managing the transaction. iRouter 101 manages interactions with customer 103 according to one or more programmable scripts, called, according to this exemplary embodiment, "workflows." In general, a workflow comprises an interaction flow wherein the path through the workflow depends upon intent input from the customer. Workflows are preprogrammed by system engineers and, advantageously, periodically "tweaked" in order to improve customer satisfaction, speed, accuracy, etc. In accordance with this exemplary embodiment, iRouter 101 is almost always "in charge" of selecting the next step or path in the workflow.

iRouter 101 receives interaction input from interactions platform 102 in the form of audio clips, email, text data or other interaction type—depending on the form of customer communication—and forwards the input to one or more human agents 105 (sometimes referred to as "Intent Analysts" or "IAs"), speech recognition engines or expert systems (collectively 108, and sometimes referred to as "automated speech recognizers" or "ASRs") and uses the responses to advance its current workflow. When human interpretation (or translation) of the input is necessary, iRouter 101 directs human agent desktop software to display an appropriate visual context of the current workflow. Once iRouter 101 understands the input, iRouter 101 advances through the workflow and directs interactions platform 102 to respond appropriately to customer 103.

In an exemplary embodiment wherein interactions platform 102 comprises a telephony server, iRouter 101 delivers sound clips to play back to a customer, send text-to-speech clips or both. Alternatively, interactions platform 102 may store sound clips, have text-to-speech capability or both. In this embodiment, iRouter directs interactions platform 102 as to what to play to a customer and when.

iRouter 101 comprises, in this exemplary embodiment, a networked, off-the-shelf commercially available processor running an operating system such as Windows or Linux. Further, iRouter 101 software includes a modified open Voice XML (VXML) browser and VXML script incorporating objects appropriate to the specific application. One skilled in the art will understand how to construct these objects after studying this specification.

In accordance with the exemplary architecture of FIG. 1, interactive response system 100 includes at least one pool of human agents 105. A pool of human agents 105 is often located at a contact center site. Human agents 105, in accordance with the present embodiment of this invention, use specialized desktop software specific to system 100 (as will be described further, below, in connection with FIGS. 3B, 4B and 5B) that presents a collection of possible intents on their screen—along with a history or context of the customer interaction to that point. The human agent or agents 105 interpret the input and select an appropriate customer intent, data or both.

For telephone interactions, human agents 105 wear headphones and hear sound clips ("utterances") streamed from the telephony server 102 at the direction of iRouter 101. In accordance with one aspect of this invention, a single human agent 105 will not handle the entire transaction for customer 103. Rather, human agent 105 handles some piece of the transaction that has been designated by the workflow designer as requiring human interpretation of customer's 103 utterance. IRouter 101 can send the same customer 103 interaction to any number of human agents 105, and may distribute pieces of a given interaction to many different human agents 105.

In accordance with the exemplary embodiment of this invention, human agents 105 are preferably off-site. Further, human agents 105 may be in diverse geographic areas of the world, such as India, the Philippines and Mexico. Human agents 105 may be in groups in a building or may be working from home. In applications that require 24/7 human agent support, human agents 105 may be disposed around the world so that each human agent 105 may work during suitable business hours.

Interactive response system 100 of the present invention employs custom human agent application software. Human agents 105 use a custom application developed in Java and running on a standard call center computer network workstation. Generally speaking, interactive response system 100 applies human intelligence towards interpretation of customer 103 input into "intent" (what the customer wants) and data (any input required to determine what the customer wants). The interpretation normally comprises selecting the most-correct interpretation of what was said from a list of choices, in this exemplary embodiment. In an alternate embodiment, computer-aided data entry (e.g., auto-completion of text entry or entry of an email address) is used in connection with agent processing.

Workflow server 106 of the present invention, an off-the-shelf component, is an archive of the workflows used by the Interactions router. Workflow server 106 is in one embodiment built with off-the-shelf hardware using a commercially available processor running a standard server operating system, with the workflow documents written in XML in this exemplary embodiment. Workflow server 106 maintains a compilation of business rules that govern the behavior of iRouter 101.

Interactive response system 100 employs a workflow designer used by a business analyst or process engineer to map out workflows. A workflow serves as the map that iRouter 100 follows in a given interaction, with speech recognition or human agents. The workflow "steers" iRouter 101 along a path in the workflow in response to customer input. A place in the workflow, along with data collected to that point is called a "context."

The workflow designer builds instructions for human agent 105 into the workflow in order to guide human agent 105 in interpreting intent. The workflow designer may include a version of Eclipse software development environment customized to focus on building XML documents. However, one skilled in the art will be able to develop a workflow designer after studying this specification.

Performance and interactions archive 107 of the present invention comprises a database that can be maintained on any common computer server hardware. Performance and interactions archive 107 contains both archival data of system transactions with customers 103 (i.e., a repository of sound clips, e-mails, chats, etc. from interactions with customer 103) as well as performance data for human agents 105.

This exemplary embodiment employs "reporter" software to generate statistics about a group of interactions or to display performance ranking for human agent 105. Reporter software can also reconstruct an interaction with customer 103 from sound clips, e-mails, or chat text that constituted customer's 103 contact stored in interactions archive 107. Reporter software is a series of simple scripts, and can run on any common server hardware.

This exemplary embodiment also includes manager/administrator software, usually run from the same station as reporter software. Manager/administrator software sets operating parameters for interactive response system 100. Such operating parameters include, but are not limited to, business rules for load balancing, uploading changes in workflow, and other administrative changes. In one particular embodiment, manager/administrator software is a small custom Java application running on a standard call center computer workstation.

Support system 108 consists of numerous databases and customer proprietary systems (also including off-the-shelf automated speech recognition (ASR) software such as Nuance) that may be employed in responding to customer 103 requests. For example, support system 108 may include a database for customer information or a knowledge base. Speech recognition software is, in this exemplary embodiment, an off-the-shelf component used to interpret customer 103 utterances. Support system 108 may also include a text-to-speech capability, often off-the-shelf software that reads text to customer 103.

Company agents 109 of the present invention consist of human agents that handle customer 103 requests that the workflow refers to them. For example, should customer 103 intend to obtain assistance with a company matter, and an outsourced human agent 105 identifies that intent, the workflow may direct interactive response system 100 to transfer the call to company agent 109.

The elements of interactive response system 100 communicate over a TCP/IP network in this exemplary embodiment. Communication is driven by the workflow that iRouter 101 follows. "Database" in the present embodiment can be a flat file database, a relational database, an object database, or some combination thereof.

Turning now to FIGS. 2 through 5, these figures illustrate an example of how information is retrieved and handled by interactive response system 100 when a customer interacts with the interactive response system 100 via telephone. The example shown in FIG. 2 presupposes that all required hardware, software, networking and system integration is complete, and that a business analyst has mapped out the possible steps in a customer interaction using the graphic workflow designer. The business analyst also has scripted the text for anything that the interactive response system may say to a customer 103, including, but not limited to, the initial prompt (e.g., "Thank you for calling, how can I help you today?"), response(s) to a customer, requests for additional information, "stutter speech" (sounds sent to the customer while the iRouter 101 is determining a response), and a closing statement. Either text-to-speech software or voice talent records the server-side speech pieces as written by the business analyst. This workflow is then loaded into the interactive response system 101 where it is available to the iRouter 101.

As shown in block 201, the interaction begins with the customer 103 calling the customer service telephone number of a company. The interactions platform 102, in this case a telephony server, answers the telephone call and retrieves the appropriate workflow stored in the workflow database, based on either (1) ANI/DNIS information of the caller or (2) other business rules (e.g., line or trunk the call came in on), as illustrated at block 202. The telephony server then plays the appropriate welcome prompt as illustrated at block 203 and the customer then responds to that prompt (block 204).

For purpose of example, an imaginary airline, Interair, provides customer service via an interactive response system in accordance with a call center embodiment of this invention. The interaction platform 102 is therefore a telephony interface and iRouter 101 selects a workflow appropriate to Interair.

A first point or context in the workflow is shown in the illustrative workflow of FIG. 3A. There is no customer utterance, thus no intent or data to capture (and respond to). The only response is the greeting and the prompt for customer input.

Figure 2:
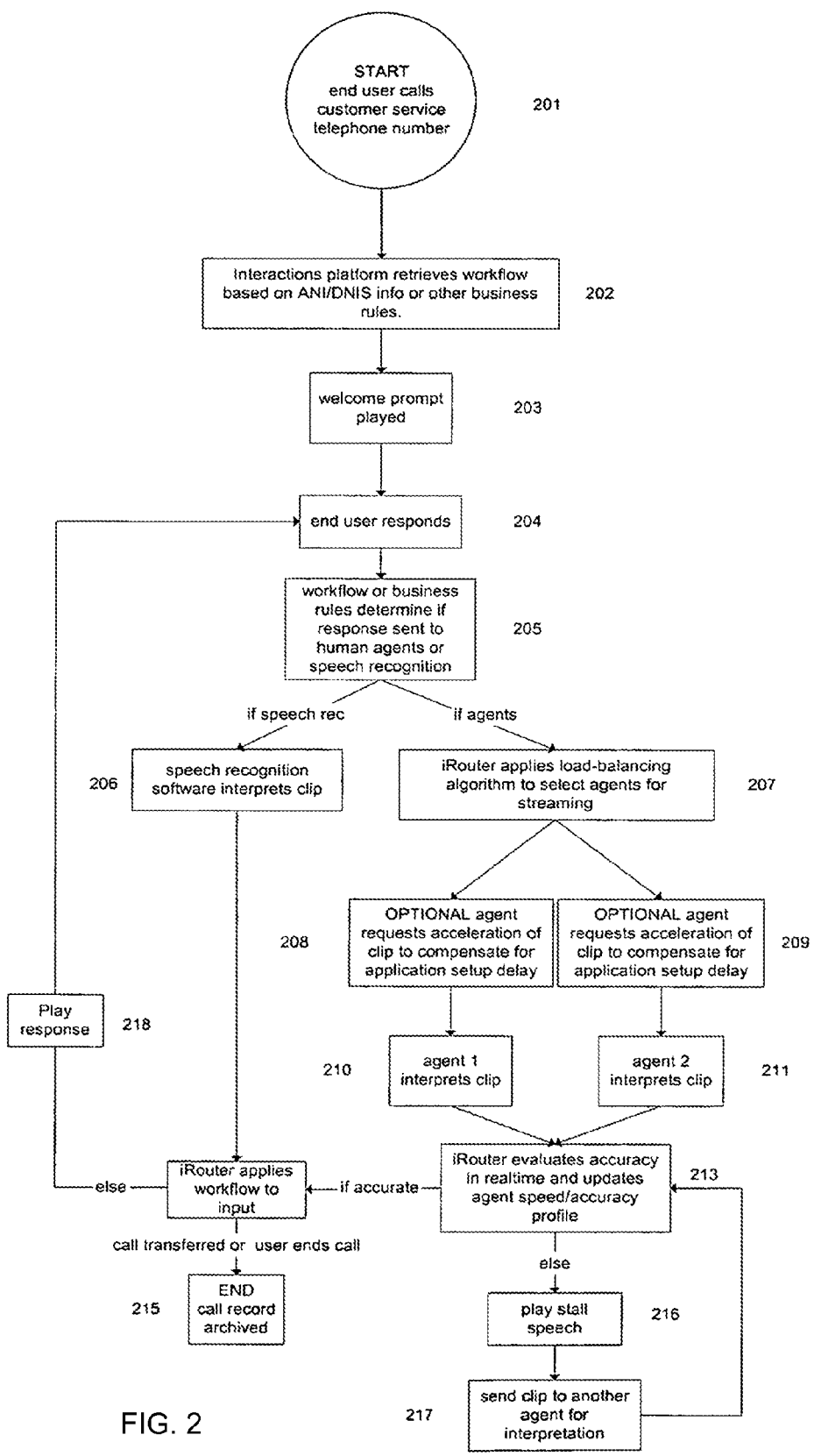
FIG. 2 is a flow chart illustrating an embodiment of a method for communication among a customer, the interactive response system and a human interface.
Figure 3B:
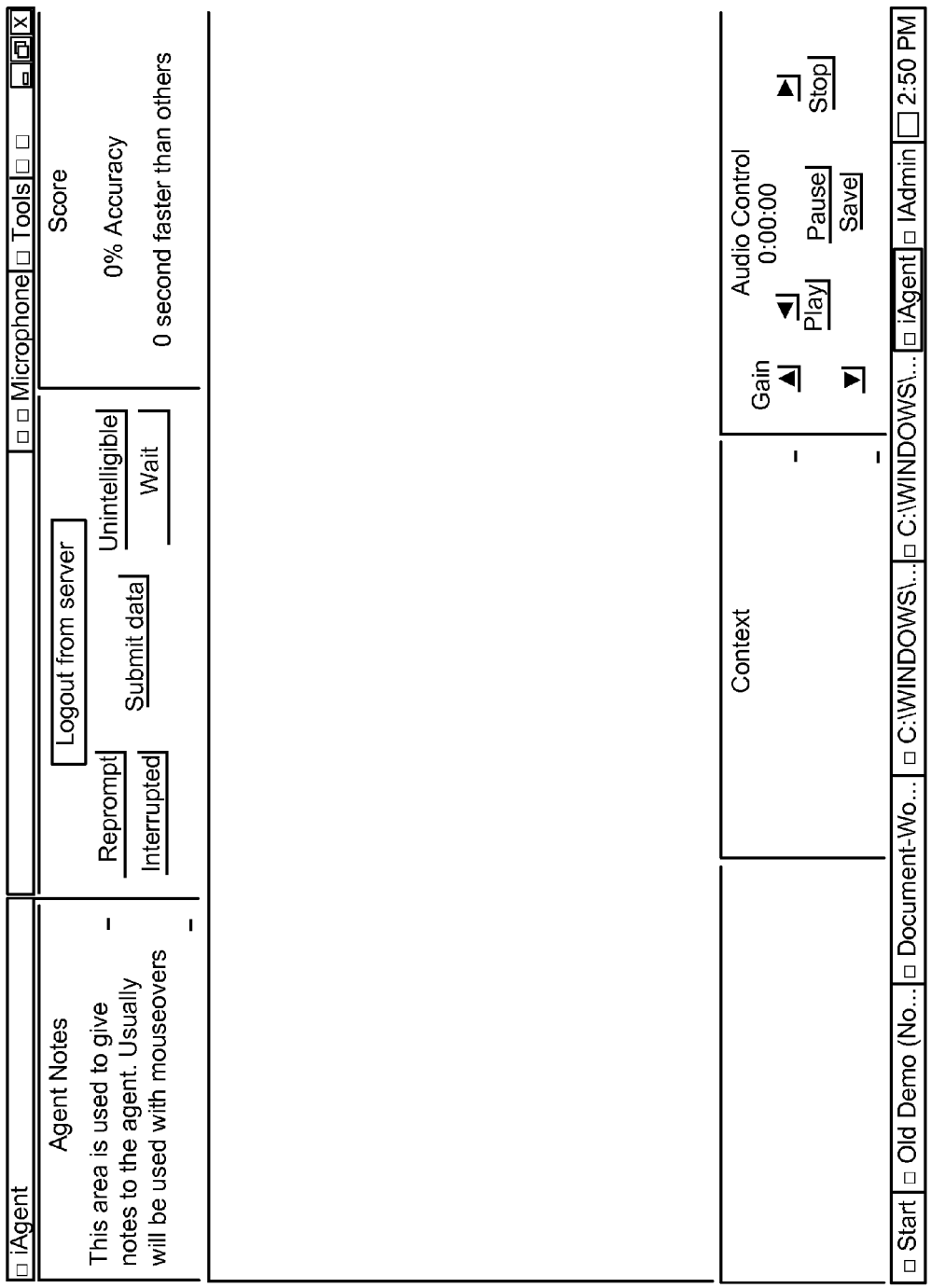
FIG. 3B is a computer screen illustrating one embodiment for capturing customer intent and data in the context of FIG. 2.

Processing proceeds to box 204 in the flowchart of FIG. 2. The telephony server begins digitizing the customer's spoken input and connects to the iRouter. At this point, workflow or business rules determine if the interactive response to the customer needs to be handled by a human agent or speech recognition software. That is, the iRouter selects the appropriate workflow for the call from the workflow repository and follows the workflow rules to conduct a conversation with the customer.

To interpret customer speech, iRouter 101 uses ASR from the support systems or has the customer's audio streamed to human agents 105 in contact centers as appropriate, as illustrated in block 205. If human agents 105 are required by the workflow, iRouter 101 identifies available human agents by applying a load balancing algorithm, triggers a pop-up on their screens (as illustrated in the initially blank pop-up screen, FIG. 3B), presents several selectable intent options, and begins streaming customer audio to the identified human agents, as shown at block 207. This load balancing, at various times, includes identifying more or fewer human agents for interpreting the utterance based on any of a variety of factors, as will occur to those skilled in the art given the present disclosure. The human agent(s) hear the customer utterance in headphones, and computer software prompts for an interpretation of the utterance as shown in blocks 210 and 211.

Figure 4B:
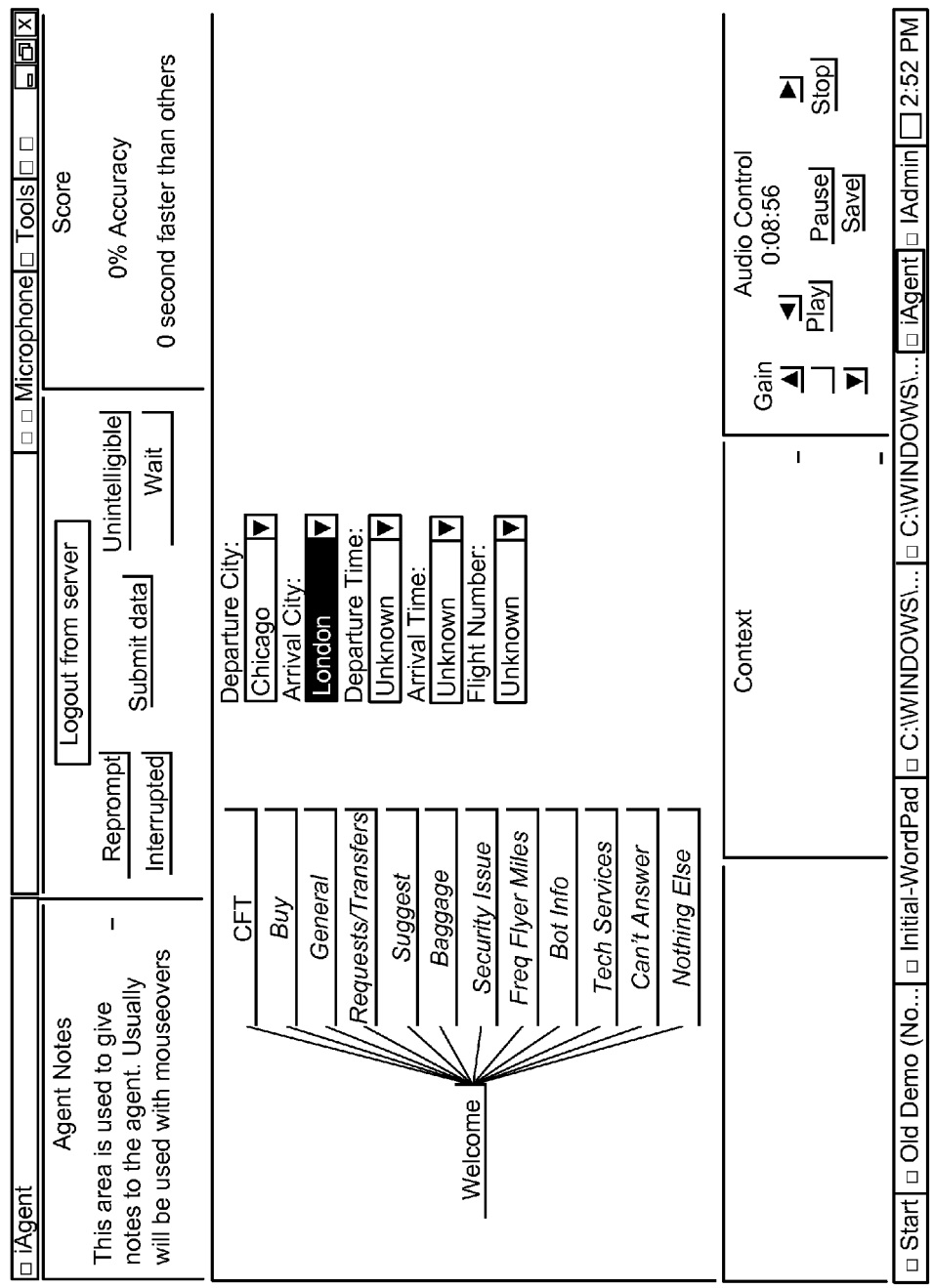
FIG. 4B is a computer screen illustrating one embodiment for capturing customer intent and data in the context of FIG. 2.

In accordance with the exemplary workflow of FIG. 4A, the customer utterance that the human agent or agents hear is "I need to check my flight from Chicago to London this afternoon." The agents' screen indicates the current context (or point in the workflow) as illustrated in FIG. 4B. In this illustrative screen shot, there are 12 possible requests (including unanswerable and terminate) that the human agent can select. In operation, there are several hundred possible interpretations available to the agents. Such multiplicity of selection allows the agents interpretive flexibility, which enables the iRouter to jump around in its workflow according to the interpreted intent. Thus, in accordance with one aspect of this invention, the iRouter can respond appropriately even if the customer changes subjects in midstream.

In each case, each agent selects what he or she feels is the best fit interpretation of the customer utterance in the current context of the workflow. In example of FIG. 4B, the human agent(s) selects "CFT" (Check Flight Time) and enters or selects from drop down menus the departure and arrival cities (or other, preprogrammed information that the customer could possibly utter).

Note that, in blocks 208 and 209, human agents can elect to apply acceleration to the customer audio clip(s) received at the station in order to compensate for any response delay (usually due to lag time in application set-up—the time it will take for human agent desktop software to accept the streaming audio and display the appropriate workflow). Network latency might be around 0.2 seconds, where application delay could be more in the 1+second range. To compensate for the application delay, the interactive response system accelerates the voice clip (although not to the point of discernible distortion). The purpose is to strive for a more "real-time" conversational interaction, so that the customer does not experience a notable delay while awaiting a response. The acceleration is applied to the speech as it is streaming from the telephony server. The acceleration can never overcome the inherent latency of the link but will allow human agents to "recover" any application set-up time and reduce the amount of lag time in the interaction, ideally up to the limits imposed by latency in the network. However, acceleration is optional, wherein a novice agent may need a slower playback, while a more experienced agent may apply acceleration.

In test 213, the iRouter evaluates the accuracy, in real time, of the customer audio interpretation and updates each agent's speed/accuracy profile. Next, in block 214, the iRouter processes the interpretation and performs the next step(s) in the workflow (e.g., database lookup based on input data) and then forwards an appropriate response 218 to the customer through the telephony server (if the interpretation is deemed accurate). If the iRouter determines the interpretation is accurate, it directs the playback of responses to the customer from the telephony server based on the interpretation of either the speech recognition software or by applying key algorithms to the responses of one or more human agents. In this example, the response is given in the last block of screen 2, FIG. 4A.

To determine accuracy, the iRouter compares the interpretation of two human agents, and, if no consensus is reached, plays the customer audio clip for a third human agent for a further interpretation (i.e., "majority rule" determines which is the accurate response). Other business rules may also be used to determine the accurate interpretation. For example, an interpretation from the agent with the best accuracy score may be selected. Alternatively, one of the interpretations may be selected and played back to the customer ("I understood you to say . . . ") and the customer response determines whether the interpretation was correct. Further, the interpretations may be selected from known data (e.g., two interpretations of an email address could be compared against a database of customer email addresses, only one of two interpretations of a credit card number will pass a checksum algorithm, etc.).

The interactive response system allows for virtually any number of human agents to handle to same customer interaction at once. That is, an interactive response system could have two agents listening during a busy time or have seven human agents listening during a more idle time. Moreover, during times of high call volume, accuracy can be decreased by removing the "double-checking" rule to maintain high response time. An agent assigned a high trust ranking based on the agent's speed/accuracy profile may be asked to work without the double-checking. In addition to trading off accuracy for quicker system availability, a steady flow of audio clips is flowing by each agent, thereby decreasing human agent "slack" time.

Returning to the flowchart of FIG. 2, either the customer will respond again as seen in block 204, the call will be transferred (if so directed by a step in the workflow or by business rules), or the customer terminates the call, as shown in block 215. If the interpretation is deemed inaccurate in block 213, the iRouter 101 plays a stall speech to the customer (block 216) and sends the audio clip to additional human agents for another interpretation (block 217) and then reevaluate its accuracy.

The iRouter manages interaction with the customer to call completion, using the workflow as its guide. The iRouter may stream customer utterances to human agents for interpretation at numerous points in the call. Once the call has concluded, a snapshot of the customer interaction is preserved in the archive database. Human agents' speed/accuracy profiles are constantly updated and maintained.

If human intervention is not needed to interpret customer's request, ASR interprets the audio clip and the iRouter determines the appropriate response as shown in blocks 206 and 214.

Figure 5B:
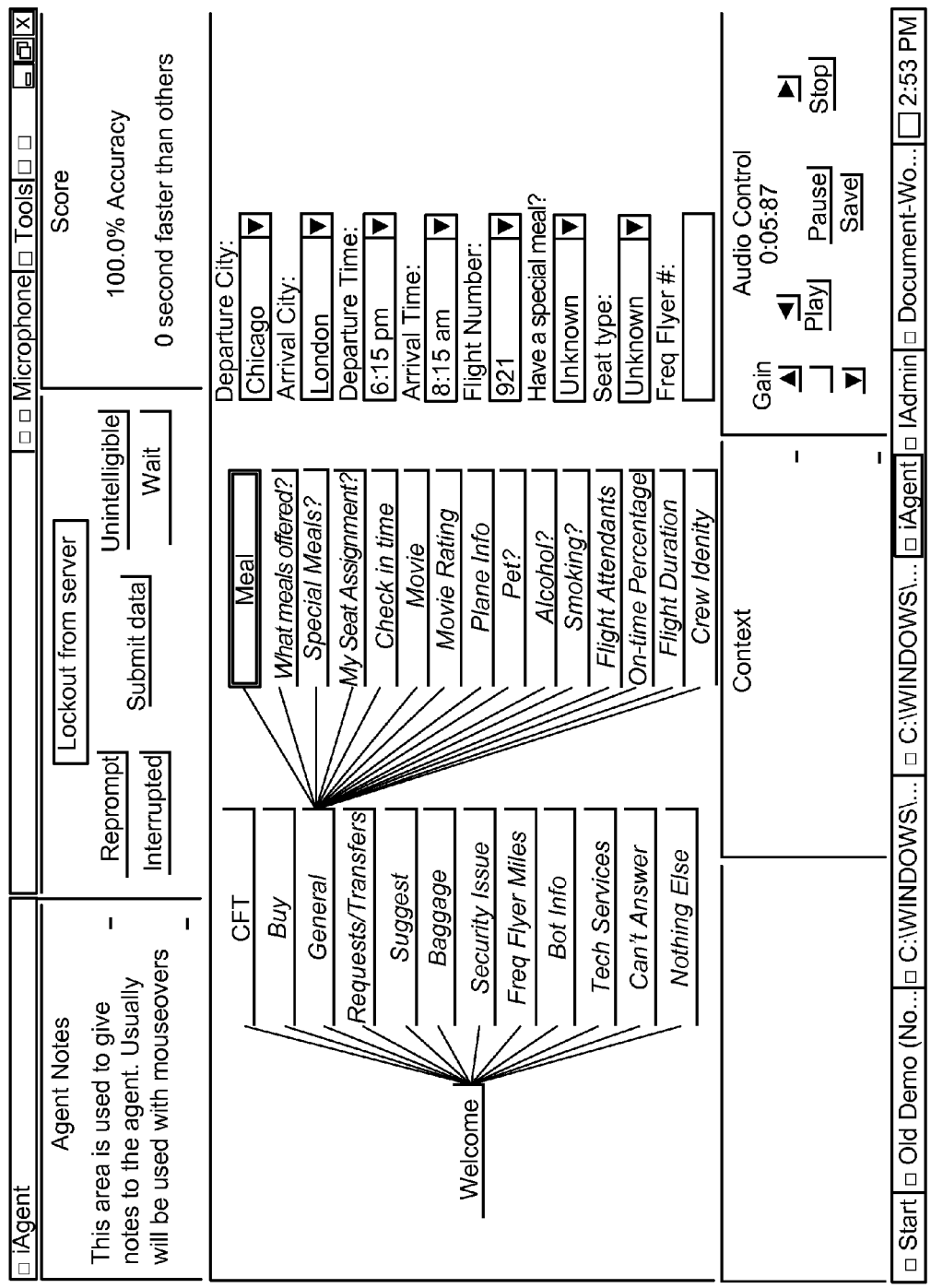
FIG. 5B is a computer screen illustrating one embodiment for capturing customer intent and data in the context of FIG. 2.

Continuing with the Interair example, the captured customer utterance, as seen in FIG. 5A, has two requests: food and entertainment queries. In accordance with another aspect of this invention, the human agent captures two intents: meal and movie. There is no relevant data to enter because the interactive response system already knows the flight information from the previous data entered in FIG. 4B (this data is visible in FIG. 5B). As seen in FIG. 5B, the human agent enters "General" and "Meal" from an on-screen display of possible intents. The human agent also enters "Movie." As seen in FIG. 5A, the interactive response system then provides the appropriate response. As seen in FIG. 5B, if the customer requests further information regarding the meal or movie such as: "what meal is offered?", "Are their special meals?", "What is the movie rated?", the appropriate human agent interpretation options are located on the computer screen.

Figure 6:
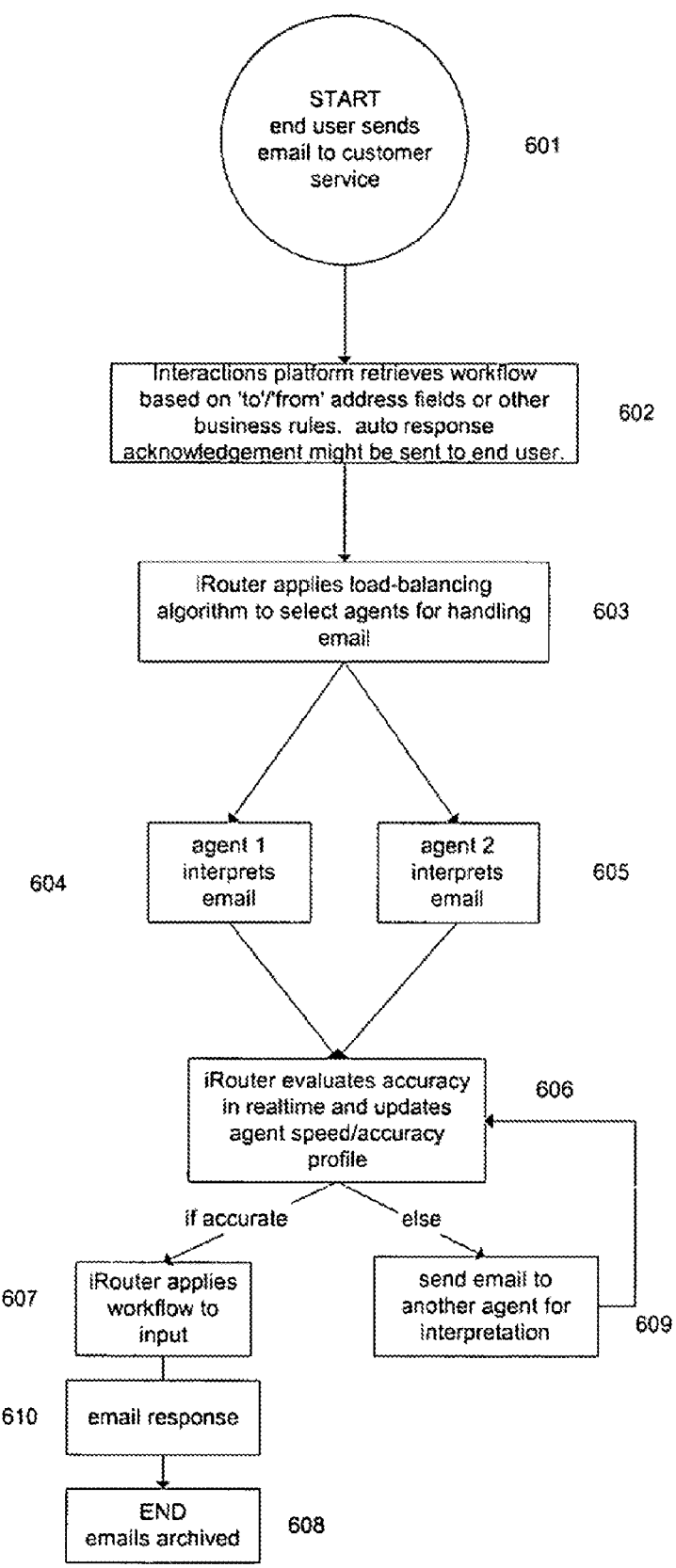
FIG. 6 is a flow chart of processing an email in the context of an interactive response system.

FIG. 6 illustrates an example of how information is retrieved and handled by the interactive response system when a customer interacts via electronic mail (email, as it is commonly known in the art). As shown in block 601, the interaction begins with the customer emailing to the customer service email address of a company. The interactions platform, in this exemplary embodiment, a gateway server, opens the email and retrieves the appropriate workflow stored in the workflow database based on either (1) the to/from information of the customer or (2) other business rules, as illustrated at 602. The gateway server then sends the appropriate response acknowledgement as illustrated at 602. Then the iRouter 101 identifies available human agent(s) to handle the email by applying a load balancing algorithm, triggers a pop-up on their screens to show possible intents for interpretation, and sends the email content to the or those human agents, as shown at block 603. The human agent(s) interpret the email as shown in blocks 604 and 605. After test 606, where the iRouter 101 evaluates the accuracy, in real time, of the customer email interpretation and updates each agent's speed/accuracy profile, the iRouter 101 processes the interpretation and performs the next steps in the workflow accordingly. Eventually, the iRouter 101 forwards an appropriate email response to the customer through the gateway server (if the interpretation is deemed accurate) as seen in block 607. The emails are then archived in the appropriate database as illustrated in block 608. If the interpretation is deemed inaccurate, the iRouter 101 sends the email to another human agent for another interpretation (block 609) and then reevaluates its accuracy. The iRouter 101 manages interaction with the customer to email response, using the workflow as its guide.

The discussion of an interactive response system and its constituent processes above in connection with FIGS. 1-6 includes operation of one or more speech recognition and related subsystems 108. In practice, implementation of IVR system 100 requires such subsystems 108 to be capable of recognizing a significant portion of the customers' utterances in order to minimize the need for human interaction.

Figure 7:
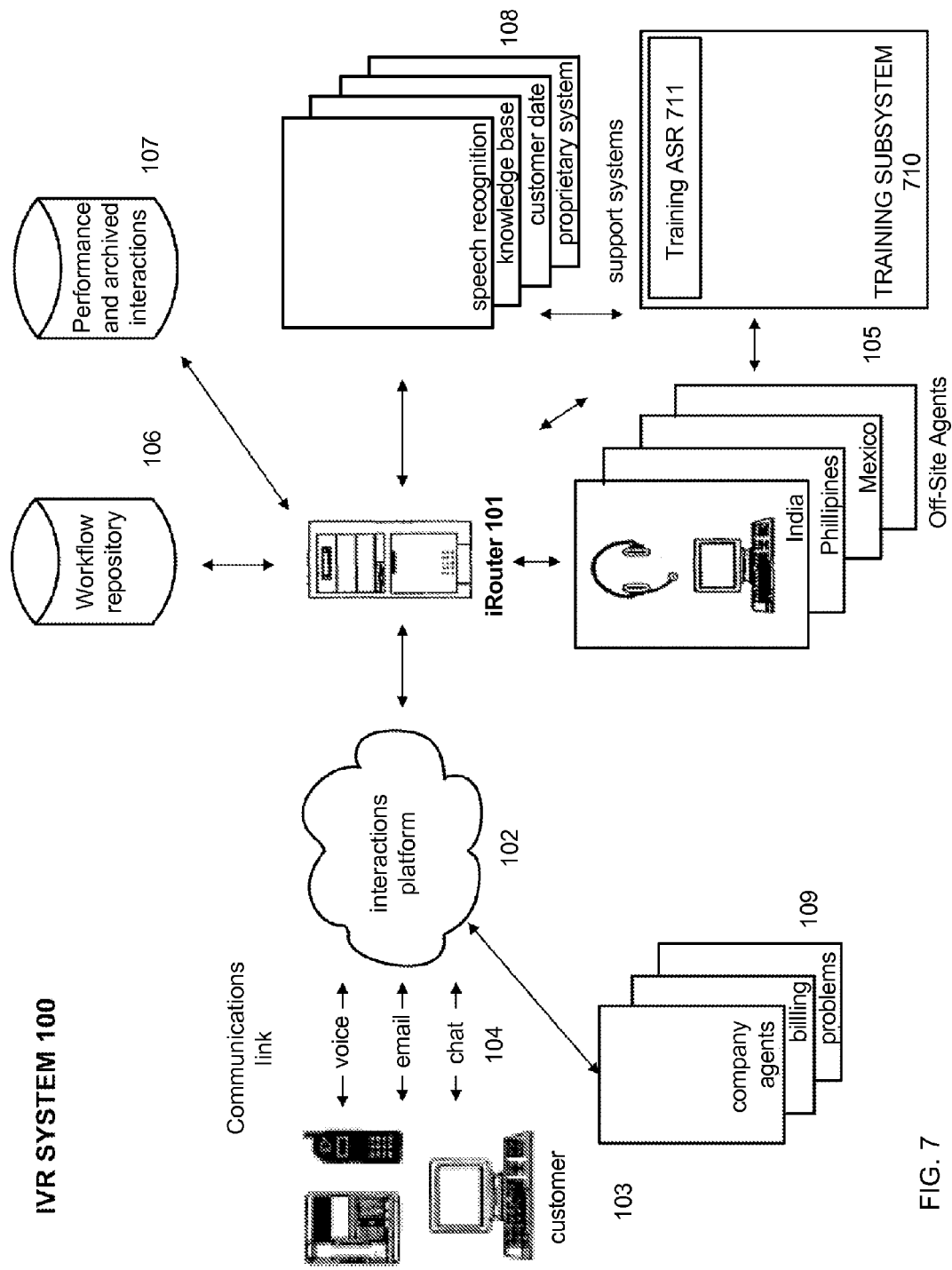
FIG. 7 is a block diagram illustrating one embodiment of an architecture of an interactive response system with a training subsystem.

Referring now to FIG. 7, a training subsystem 701 is included as a part of IVR System 100. In operation, training subsystem 701 selectively provides machine learning capabilities to real-time ASRs in subsystems 108 to allow them to very quickly adapt to new or changed customer interactions. For instance, when an IVR system 100 is first installed for a company, the generic capabilities of an embedded ASR may not be very usable for actual customer interactions, particularly if those interactions include many industry-specific terms (e.g., an electrician calling to order a ground fault circuit interrupter would typically use the acronym "GFCI", which few ASRs would recognize easily). Likewise, when a new offering becomes available, existing ASR capabilities may begin to fail even though they were previously successful (e.g., an ASR that correctly identified "iPod" in past uses may begin to fail upon introduction of another product with a similar name, such as "iPad"). In some applications, these changes may be infrequent, while in others, they may occur on a regular basis. For example, an application for selling tickets to rock concerts will need to adapt to new customer requests for band names on a regular basis.

In one embodiment, training takes place based on the indicated need for such training For an existing system in which ASR accuracy is well above a threshold of acceptability, training may occur only rarely, if at all. In such instances, training could occur, for example, only during periods of extremely low call volume during which IAs 105 are otherwise relatively idle. Where a system is new or whenever ASR success is dropping below acceptable limits, more training may be called for and so training subsystem 710 is active more often.

A non real-time training ASR 711 of training subsystem 710 receives as input a customer utterance from iRouter 101 and a corresponding intent from IA 105. In practice, multiple training ASRs 711 may be used as described below.

As with real-time production processing, processing for purposes of non real-time training includes in some embodiments inputs from single IAs and in others inputs from multiple IAs. Differences in intent selected by different IA's are quite helpful in training an ASR, as they may indicate a particularly nuanced utterance that calls for extensive additional training. In the simplest form, where a business intent may have a small grammar with very few options, such as "yes" or "no", and where an ASR comes with a pre-packaged understanding of the utterances in "yes" and "no", training may consist of building a statistical model that can be used for grammar tuning. In more complex training, the ASR is assisted in the recognition of words with domain knowledge, in order to build the statistical language model of the utterances that may be said.

In a preferred embodiment, IVR system 100 is implemented using multiple available real-time ASRs in support systems 108. In practice, each ASR is found to have strengths and weaknesses, and success in particular areas is usable by iRouter 101 to determine which ASR to use in a particular circumstance, as well as by training subsystem 710 to determine which ASR could benefit from training in a particular circumstance. Currently available ASRs include those from Carnegie Mellon University (Sphinx), Nuance, Dragon, Luquendo, Lumenvox, AT&T, SRI International, Nexidia, Microsoft and Google. As only select ASRs are available for no cost (e.g., under open source licenses), financial considerations may limit the number of ASRs to include in support systems 108. Because iRouter 101 can selectively route production requests to an ASR that is expected to perform well in any specific context, and because training subsystem 710 can likewise selectively train real-time ASRs based on expected improvement in their performance, it will often be advantageous to select a group of ASRs with performance characteristics that are somewhat orthogonal to one another. In that manner, one ASR can be expected to make up for weaknesses in another ASR. For example, an ASR optimized for processing telephonic speech may have performance characteristics quite different than one designed for speech from dictation equipment.

In order to increase accuracy of the real-time ASRs used with IVR system 100, training subsystem 710 facilitates machine learning by providing the real-time ASRs with training that is specific to the meaning of each received utterance, based on non real-time operation of training ASR 711.

Common ASRs are trained in several different aspects. First, ASRs must be able to classify audio streams, and portions of audio streams, into components that can help lead to recognition of a word that is being spoken. Typically, this involves identifying, within an audio stream, a set of similar sound classes known as "phones," sound transitions or combinations known as "diphones," and potentially more complex waveform portions referred to generally as "senones." Commonly, utterances are divided wherever periods of silence are detected. Features are derived from utterances by dividing the utterance frames (such as 10-millisecond timeframes) and extracting various different characterizing aspects of the audio within that timeframe, such as whether amplitude and frequency are increasing, constant or decreasing. In the Sphinx ASR available from Carnegie Mellon University, 39 features are extracted to represent speech as a "feature vector." Typically, ASR engines come with this aspect of their recognition fixed and users of such systems cannot change which features are analyzed or how they are analyzed.

ASRs use various models to proceed from raw audio waveform to a prediction of the word corresponding to the utterance. An acoustic model determines most probable features/feature vectors for received senones. A phonetic model maps phones and words, with the words coming either from a fixed dictionary or from a vocabulary (or "grammar") derived by machine learning. A language model restricts candidate word choices based on some context, such as a previously recognized word. ASRs typically use a combination of these models to predict which words correspond to utterances. It is the latter two models, i.e., phonetic models and language models, that are the focus of training in the embodiments discussed below, although the concepts addressed herein could readily be applied to other models used in speech recognition.

In many instances, training an ASR can be more effectively accomplished by using context, either from previously recognized words or, for processing that is not in real time (i.e., later-recognized words in the same customer discourse). Such training is described below.

Turning first to phonetic models, consider the following user utterance: "I would like to fly roundtrip between Boston and San Diego." An "off-the-shelf" ASR may have some difficulty recognizing some of these words across a variety of speakers. For example, in pronouncing the word "roundtrip" some speakers may conflate the "d" and "t" consonant sounds into one sound ("rountrip"), while others may enunciate them separately (as if they were the two words "round" and "trip").

In one embodiment, training subsystem 710 provides machine learning to non-real time training ASR 711 by addressing each of these issues. First, training subsystem 710 selects a target vocabulary based on a business meaning that corresponds to the utterance as determined by an IA 105 when the utterance was initially received. In this instance, the IA likely selected "New Reservation" as the business meaning. Whereas the word "roundtrip" may have been one word out of 40,000 in a general grammar, with a very low statistical rate of occurrence, it may be one word out of only 1,000 in a grammar specific to the "New Reservation" intent, and may have a statistical rate of occurrence that is far higher. Thus, training subsystem 710, by changing the applicable grammar, significantly increases the probability that training ASR 711 will accept the word "roundtrip" as what was spoken, even if the feature vectors vary significantly from a standardized model of that word. Furthermore, as additional utterances of "roundtrip" become associated with the "New Reservation" intent, those utterances likely will more closely match at least some of the previously recognized instances in which "roundtrip" was spoken. Thus, over time both the likelihood of the word "roundtrip" occurring in a "New Reservation" intent and the variations in pronunciation of that word will lead to two results: (a) greater certainty in recognizing the word (which can be propagated to other grammars that include the same word, such as a grammar associated with the "Cancel Reservation" intent); and (b) better ability to predict business intent by refined statistics as to how often the word is associated with a particular intent.

Returning to the utterance example used above, fast-talking speakers may blur the distinction between "Boston" and the following word "and," and may fail to articulate all of the sounds such that training ASR 711 may be trying to analyze a sound, "Bostonan." Likewise, the city name "San Diego" may be pronounced by some speakers in a manner that sounds more like "Sandy A-go." The selection of a "New Reservation"-specific grammar rather than a generalized grammar would again likely dramatically increase the statistical likelihood that recognition of "Boston" and "San Diego" will be achieved with confidence. As a further refinement, training subsystem 710 employs iterative passes through the utterances of an entire user discourse to improve training even further. In the example given above, it may be that later in the discourse the caller says "Boston" at the end of a sentence, in a manner readily recognized by training ASR 711. That speaker's acoustical signature for "Boston" is included in the ASR's mapping, so that on a second pass, the same speaker's "Bostonan" utterance will be considered a better match for "Boston" than it was before. Similarly, the speaker may say "San Diego" a second time in a manner that provides more distinction between "San" and "Diego," thereby providing learning that upon an iterative recognition attempt will lead to a greater likelihood of successful recognition of the first, blurred utterance. For extensive customer discourses, multiple iterations may lead to significant improvement in overall recognition, as the caller's voice characteristics become better understood through the words that the system can recognize.

Figure 10:
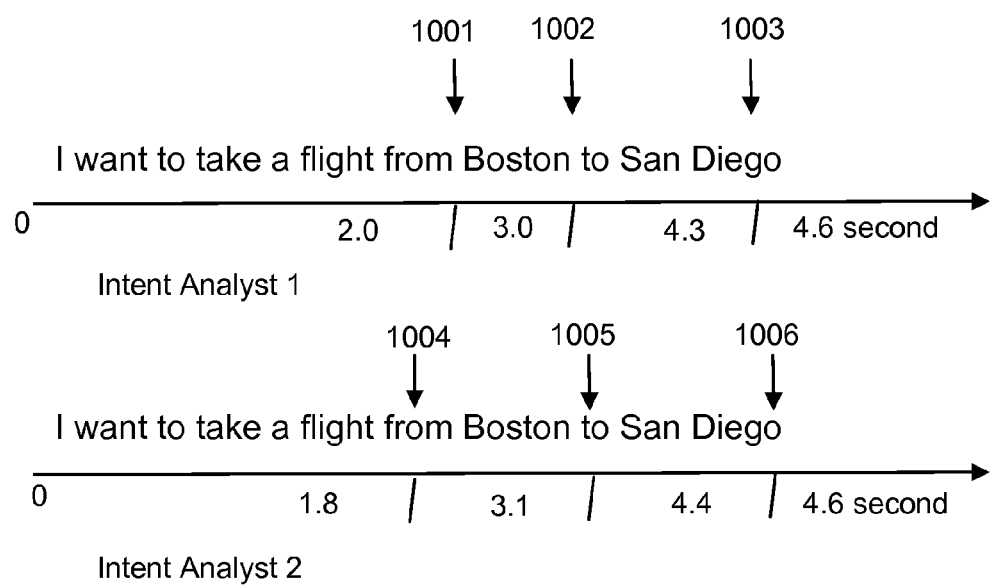
FIG. 10 is a timeline representation of recognition of intents and data of an audio stream by different intent analysts.

Referring now also to FIG. 10, in one embodiment the actual time of recognition by an intent analyst is used to decompose an audio stream into separate utterances for recognition (e.g., by training ASR 711). Specifically, the time of recognition of the utterance intent "I want to take a flight from" (1001, 1004), the time of recognition of the data portion "Boston" (1002, 1005), and the time of recognition of the data portion "San Diego" (1003, 1006) are all sufficiently distinct that the timeframes themselves are usable to facilitate decomposition of the audio into separate utterances for recognition. In some instances, an IA may provide recognition before (or after) the utterance is complete (e.g., as shown in FIG. 10 at 1003, "San Diego" is recognized by the IA before the final "o" sound), so in such cases time frames are adjusted to end at suitable pauses after (or before) the IA-provided recognition. The number of possible business intents and typical words used to express them are usable to narrow the intent recognition grammar, and the type of data collected (e.g., city names) are usable to narrow the data recognition grammar.

Moving on to language models, training system 710 again takes advantage of business intent to assist with training. For instance, where an IA has indicated a business intent of "New Reservation" it may be statistically quite likely that at least one instance of the word "and" in the utterance will be preceded by one city name and followed by another city name. Likewise, if the words "from" or "to" are recognized, it may be statistically very probable that a city name follow those words. In contrast, if a business intent determined by an IA is "seat assignment," those same words "from" and "to" may rarely correlate with an adjacent city name but a nearby number-letter pair instead (e.g., "I would like to change from seat 39B to seat 11A.").

Such language model training also allows for ready adaptation to changing user phrasings. For example, if an airline begins service to England, it may suddenly start receiving requests using different language than was used before, for the same business meaning. For instance, the prior example of "I would like to fly roundtrip between Boston and San Diego" might be spoken by a British customer as "I would like to book a return trip between Boston and London." Initially, the word "book" and would not appear with high probability in the "New Reservation" grammar, but statistical usage of that word in that grammar quickly increases with additional British customers. Likewise, use of the term "return" changes with the addition of a British customer base, and the "New Reservation" grammar is adjusted accordingly to recognize this.

Training subsystem 710 also adjusts statistics for recognition candidates based on a combination of business intent and adjacent recognized words in the discourse. Consider the example in which a business intent has been determined as "New Reservation" and only one utterance in a user's discourse is not initially recognizable with a usable level of confidence. If the discourse is recognized to have included only one city name, the probability that the unrecognized utterance is another city name is quite high; the probability that it is a city name served by the airline using the system is higher yet. Changing the probabilities for candidate words within a grammar to recognize the partial recognition may well drop some candidates words from further consideration and may bring only one candidate (presumably a city name) to a usable level of certainty. Machine learning then incorporates that particular user's enunciation of the city into the ASR's model so that subsequent instances of similar utterances are more readily recognized.

Maintenance of separate grammars for each allowable business intent facilitates training subsystem 710 to provide more rapid teaching of ASRs than would otherwise be possible. For example, there are strong phonetic similarities in the utterances "book," "notebook" and "Bucharest." Determining which of these meanings corresponds to a user's utterance is greatly enhanced by considering the business intent. For example, if the business intent is "Lost & Found," then "book" (in its noun sense) and notebook (as in "notebook computer") may appear with much higher likelihood than in other contexts. If the business intent is "New Reservation," then "book" (in its sense as a verb) may also appear with fairly high likelihood. Similarly, if the business intent is "New Reservation," then "Bucharest" may appear with higher likelihood than if the business intent were, for instance, "Seat Selection."

Once training ASR 711 has itself been sufficiently trained, correlations between business intents and language models can be developed in a very robust manner. For instance, one exemplary portion of a mapping for similar-sounding words might be as follows:

| Business Intent | Words and Probability |
| --- | --- |
| New Reservation | Book (0.8) |
| | Bucharest (0.1) |
| | Brook (0.1) |
| Lost & Found | Book (0.7) |
| | Notebook (0.2) |
| | Bucharest (0.1) |
| Seat Selection | Bulkhead (0.8) |
| | Bucharest (0.1) |
| | Book (0.1) |

Training ASR 711 is particularly well-suited to develop language model statistics because it has two advantages over real-time ASRs from support systems 108. First, since it is not used for production operations, it does not need to operate in real time and can therefore take advantage of more complex recognition algorithms that could not, at least on relatively modest computing platforms, perform recognition quickly enough to be used for real time processing. This allows training ASR 711 to recognize utterances that real time ASRs in support systems 108 would not be able to recognize. Second, training ASR 711 can take advantage not only of a priori information from a customer discourse, but a posteriori information as well. Thus, it can wait until all utterances in an interaction are analyzed and then take multiple passes at recognition, presumably with greater likelihood of success on subsequent iterations. As noted above, an initial user utterance that sounds like "Bostonan" may be far more readily recognized after a second utterance of "Boston."

Training ASR 711 builds, over time, a set of statistics related to language elements used with each associated business meaning. In one embodiment, multiple training ASRs 711 are used, each one contributing to the overall statistics. In some embodiments, the statistics include measures of certainty regarding recognition, based on multiple instances of recognition by a single training ASR 711, on agreement between multiple training ASRs 711, or both.

The statistics developed in this manner are usable by any of the real-time ASRs in support systems 108. Each of the different ASRs that may be used for real-time recognition in support systems typically has its own mechanism for training and corresponding specifications for how language models may be input to it for training. In a preferred embodiment, training subsystem 710 formats the statistics it develops for each of the ASRs in support systems 108 so that each of those ASRs can take advantage of the statistics generated by training subsystem 711. In practice, ASRs vary widely in the mechanisms they support for training, and training algorithm 712 is therefore readily configurable to collect, format and provide to ASRs training data in a manner appropriate for each existing ASR as well as new ASRs that may be added to support systems 108. As the performance of a real-time ASR improves with training, the quality of its recognition may allow it to replace the function of an IA 105 in processing 210,211.

Training subsystem 710 also works in conjunction with the capabilities of each ASR to ensure that the ASR training is leveraged maximally for use in IVR system 100. For example, an ASR may support a threshold determination for when sufficient portions of an utterance are recognized to be usable to perform statistical analysis, such as using sentence trees, and training algorithm 712 is configured to be compatible with such features so as to determine training progress.

The real-time ASRs in support systems 108 are used in two different ways calling for different statistical processing. In a first manner, they are used to recognize a process once an IA has determined a corresponding business intent. For example, one or more IAs 105 may select "New Reservation" as a business intent for a sentence spoken by a caller, and based on that one or more real-time ASRs in support systems 108 will attempt to recognize the specific words spoken by the caller.

In a second manner, a real-time ASR rather than an IA is used to determine the business intent. This is a different recognition task than determining the specific words spoken by the caller. For instance, determining whether a business intent may be "New Reservation" or "Seat Request" may involve recognition of a small number of highly likely key words specific to each intent, such as the words "from" and "to" for "New Reservation," and the words "aisle" and "window" for "Seat Request." One type of ASR in support systems 108 may be better suited to determine business intent, and another may be better suited to recognize words based on a that business intent. In one embodiment, the format of training statistics for each real-time ASR provided by training subsystem 710 is adjusted based on whether the real-time ASR is to be optimized for determining intent or recognizing words based on a determined intent.

Part of the training process includes determining how effective machine learning has been for the real-time ASRs in support systems 108. This is referred to as validation. In a preferred embodiment, validation is performed by training subsystem 710; in alternate embodiments validation is performed by iRouter 101 or a dedicated validation processor (not shown). In validation, ASRs are operated in parallel with one another and with IAs to determine how their performance compares. Each training instance provides more information that is used to develop statistical models and probabilities of grammar uses for each business meaning provided by the IAs. In some situations, historical data from IAs also determine the anticipated level of automation that may be available with respect to an utterance. If IAs routinely provide multiple meanings for an utterance, it may be that an ASR will only be usable if it is capable of significant contextual training Those ASRs that have robust context processing may be able to properly process such utterances while those that are not contextually strong may be incapable of meeting a minimum threshold regardless of how much training is provided. As an example, the utterance "IP" could mean "Internet Protocol" or "Intellectual Property." If used in an application where both meanings are common, mistakes in processing accuracy are to be expected unless an ASR is capable, after training, of deriving which of the two meanings is the appropriate one.

As training proceeds, the performance of a real-time ASR improves. At a point of statistical stabilization that meets the needs of the particular use of the ASR within IVR system 100, the ASR is placed into production operation. For example, an ASR intended to determine a business meaning for an utterance may operate in a non-production mode in parallel with an IA until such point as it has been trained enough that its performance approaches that of the IA, at which time it is switched to production operation to relieve the load on the IAs in processing 210, 211.

In a typical embodiment, in both real time production processing and training processing, input from two IAs is provided to two ASRs to increase accuracy. Should input from two IAs for the same utterance in the same user discourse differ, in some embodiments the utterance is submitted to a third IA (in some instances selected based on a measure of IA quality) for determination of meaning.

When an ASR reaches a level of accuracy above a certain threshold, as determined through validation and based on the specifics of the environment, training processing transitions. In one exemplary environment, the ASR is used for production processing but training continues as described above. In a less demanding environment, or in one with fewer available resources, training ceases altogether. In a third environment, training continues but at a reduced priority (e.g., training processing occurs only when there is a certain amount of available processing capacity or when the performance of the ASR is found to have deteriorated to a certain degree).

In some embodiments, a validation processor is configured to test ASRs to determine their performance levels. In some embodiments, validation follows a training phase, while in others it is performed concurrently with training. Based on results from validation, iRouter 101 changes its allocation of utterances to ASRs and IAs. For instance, if an ASR is found to perform sufficiently well in comparison with an IA in determining a business meaning, iRouter 101 routes utterances to that ASR far more often than to the IA. Advantageously, such routing is highly adaptable and configurable. Following the example used in connection with FIGS. 3-5, based on performance statistics, iRouter 101 may favor an IA for response interpretation immediately after a welcome message (FIG. 4B), favor a first ASR for response interpretation for movies or meals (FIG. 5A), and favor a second ASR for response interpretation for seat assignments, plane info, and select other choices shown in FIG. 5B. In some embodiments, two ASRs (as in 210, 211) are selected for each specific area of interpretation to ensure accuracy. If both provide the same interpretation, the corresponding response is provided to the user. If the ASRs differ, then the utterance is provided to an IA to select a meaning through adjudication as in 217.

As a result, human IAs are required only at specific times when ASRs fail to adequately perform, and processing may flow back to the ASRs immediately after IA intervention depending on business criteria, with no need for an IA to stay connected to the customer discourse. Where training can improve ASRs, it does so without imposing significant additional cost or other overhead on the overall IVR system 100. Human interaction does not need to be any more involved than listening to a single user utterance and selecting a meaning, or intent, of the user from a drop-down list of predetermined options so that an appropriate automated response is provided to the user.

Figure 8:
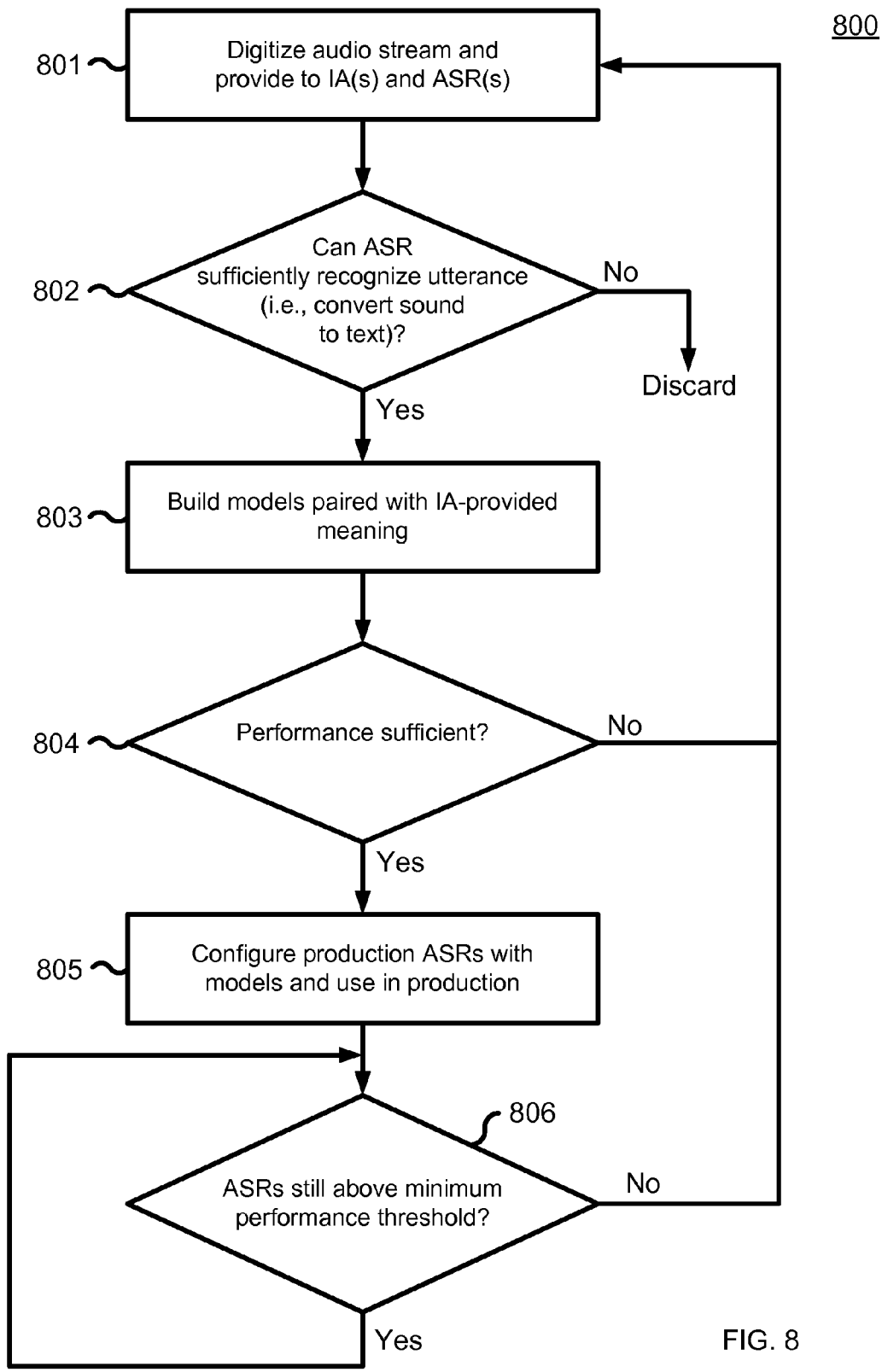
FIG. 8 is an exemplary processing flow 800 for ASR training

Referring now to FIG. 8, an exemplary processing flow 800 for ASR training is illustrated. A digitized audio stream with a user utterance is provided 801 to one or more IAs 105 and, if the IAs are able to provide a usable intent response as described in connection with FIG. 7, to training ASRs 711. If a training ASR 711 cannot sufficiently recognize 802 the utterance so as to convert the audio to a textual counterpart, the utterance is discarded and not used for training.

If the ASR 711 can sufficiently recognize 802 the utterance, statistical models/tuning grammars (e.g., grammars corresponding with IA-provided meanings and data) are built 803 as described above in connection with FIG. 7. For some of those utterances below a certain confidence threshold determined by the ASR 711, an additional verification loop for an IA to verify the recognition by the ASR 711 of the intent or data can be utilized. If the recognition is verified, processing proceeds as described for 803, but if not, the recognition results are discarded.

Next, a test is made to determine 804 whether performance of the training ASR 711 is now sufficient. The performance threshold may depend on the criticality of the application. A health care application may be much less tolerant of errors, for instance, than a free tourist information service might be. The performance threshold may also depend on the rate that new words or phrases are added to the statistical model. If the performance is not sufficient, processing returns to prepare for further utterances that can be digitized 801 and used for additional training. If performance is sufficient, the results of training are applied to configure 805 the real time ASRs of support systems 108 with the models that have resulted from the training, and those real time ASRs are then validated and, if appropriate, used for production processing.

In some embodiments, training is then considered complete. The ASR is brought on-line initially in a provisional mode, i.e., as a shadow to the IAs. If the ASR meets a level of quality as determined by business criteria (e.g., by comparing results from the ASR and one or more of the IAs), it is brought into full production use so that it replaces an IA in processing 210. Likewise, performance of a second ASR is measured and, if it produces sufficient quality in recognition, it is brought on line to replace a second IA in processing 211. In other embodiments, further testing 805 is done, at times dependent upon the specific environment, to see whether performance of an ASR has dropped below some applicable minimum threshold. If it has, flow returns to 801 for additional training. If performance is acceptable, processing loops back to 805 to repeat testing at an appropriate time. Should performance not reach an acceptable threshold after numerous attempts, in some embodiments training is abandoned.

Figure 9:
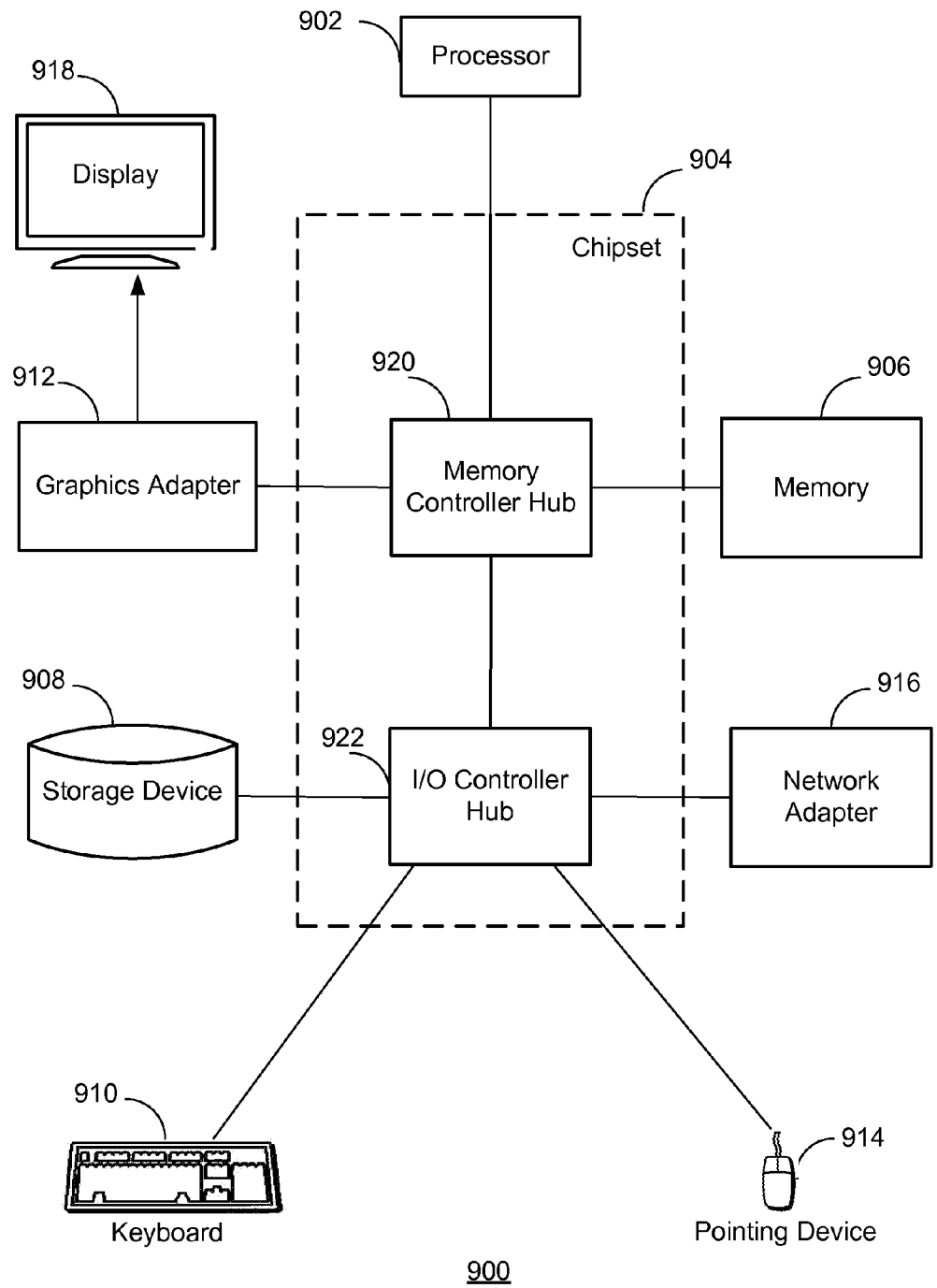
FIG. 9 is a high-level block diagram illustrating an example of a computer 200 for use as any of the computers/processors referenced herein.

FIG. 9 is a high-level block diagram illustrating an example of a computer 200 for use as any of the computers/processors referenced herein. Illustrated are at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display device 918 is coupled to the graphics adapter 912. A storage device 908, keyboard 910, pointing device 914, and network adapter 916 are coupled to the I/O controller hub 922. Other embodiments of the computer 900 have different architectures. For example, the memory 906 is directly coupled to the processor 902 in some embodiments. In some embodiments, components such as keyboard 910, graphics adapter 912, pointing device 914 and display device 918 are not used for certain of computers 200 not requiring direct human interaction (e.g., certain server computers).

The storage device 908 is a computer-readable storage medium such as a hard drive, compact disc read-only memory (CD-ROM), DVD, or a solid-state memory device. The memory 906 holds instructions and data used by the processor 902. The pointing device 914 is a mouse, track ball, or other type of pointing device, and is used in combination with the keyboard 910 to input data into the computer system 900. The graphics adapter 912 displays images and other information on the display device 918. The network adapter 916 couples the computer system 900 to the Internet 1001. Some embodiments of the computer 900 have different and/or other components than those shown in FIG. 9.

The computer 900 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 908, loaded into the memory 906, and executed by the processor 902.

The types of computers 900 used by the components described herein vary depending upon the embodiment and the processing power used by the entity. For example, a customer's computer 103 typically has limited processing power. The iRouter 101, in contrast, may comprise multiple servers working together to provide the functionality described herein. In some applications a single processor (or sets of processors) may implement both real time ASRs in support systems 108 as well as training ASR 711 and other functions of training subsystem 710. In those applications, determining how much training to do and when allows relatively inexpensive and modestly powerful computers to be used for both training and production ASR processing.

The systems and methods described above are applicable not only to voice interactions, but in certain embodiments is usable with, e.g., video, text, email, chat, photographs, and other images. These other embodiments are usable in applications such as on-line chat, security surveillance, theme park concierge services, and device help, for example. As a specific example, a consumer device such as the iPhone or iPad devices offered by Apple, Inc. can be provided with help facilities in which open-ended questions are interpreted and processed in the manner set forth above. Likewise, recognition of video streams and images can also be facilitated using the techniques as described above.

The present invention has been described in particular detail with respect to various possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention, process steps, and instructions in terms of algorithms and symbolic representations of operations on information. These algorithmic descriptions and representations are the means used by those skilled in the data processing arts to most effectively convey the substance of their work to others skilled in the art. These operations, while described functionally or logically, could be embodied in software, firmware or hardware, and when embodied in software, could be downloaded to reside on and be operated from different platforms used by real time network operating systems.

Furthermore, it has also proven convenient at times, to refer to these arrangements of operations as modules or by functional names, without loss of generality.

Unless specifically stated otherwise or as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A system for processing an interaction with a person, comprising:

a routing processor configured to receive data representing an utterance from the person;

an automated recognition processor in communication with the routing processor and configured to receive therefrom the data, the automated recognition processor producing responsive to the data an output substantially in real time corresponding to a determination of an intent of the person;

an analyst user interface device in communication with the routing processor, configured to present to a human analyst the utterance in perceptible form and to accept intent input from the human analyst; and a training subsystem in communication with the routing processor, the automated recognition processor, and the intent input and producing in response training information for the automated recognition processor.

2. The system of claim 1, wherein the training subsystem comprises a second automated recognition processor not operating in real-time.

3. The system of claim 1, wherein the routing processor is configured to selectively use the automated recognition processor responsive to a quality of operation of the automated recognition processor.

4. The system of claim 1, further comprising a second analyst user interface device in communication with the routing processor, configured to present to a second human analyst the utterance in perceptible form and to accept second intent input from the second human analyst, wherein the intent input is selectively processed by the training subsystem responsive to the intent input matching the second intent input.

5. The system of claim 1, wherein the training subsystem comprises a plurality of non real-time ASRs, the training information being generated selectively upon concurrence of the non real-time ASRs.

6. The system of claim 1, wherein the training information comprises a statistical model corresponding to the utterance.

7. A computer-implemented method for operating an interactive response system comprising:

receiving data representing an utterance from a person;

using a processor, automatically presenting the utterance in perceptible form to an intent analyst through an analyst user interface;

accepting intent input from intent analyst through the analyst user interface, where the intent input characterizes the intent analyst's interpretation of the person's intent expressed in the utterance;

providing the data and the intent input to a training subsystem;

accepting from the training subsystem training information generated responsive to the data and the intent input; and sending the training information to a real-time recognition processor in order to improve performance thereof.

8. The computer-implemented method of claim 7, further comprising accepting intent input from a second intent analyst, wherein said providing is done responsive to intent input from the intent analyst matching intent input from the second intent analyst.

9. The computer-implemented method of claim 7, wherein the training information is not generated in real-time by the training subsystem.

10. The computer-implemented method of claim 7, further comprising sending a second utterance to the real-time recognition processor responsive to performance of the real-time recognition processor exceeding a threshold quality level.

11. The computer-implemented method of claim 7, further comprising automatically presenting the utterance in perceptible form to a second analyst and accepting second intent input from the second analyst, wherein the intent input is selectively provided to the training subsystem responsive to the intent input matching the second intent input.

12. The computer-implemented method of claim 7, wherein the training subsystem comprises a plurality of non real-time ASRs, the training information being generated selectively upon concurrence of the non real-time ASRs.

13. The computer-implemented method of claim 7, wherein the training information comprises a statistical model corresponding to the utterance.

14. A system for managing interactions with a person, comprising non-transitory computer storage media storing programming instructions executable by at least one processor to:

receive data representing an utterance from a person;

automatically present the utterance in perceptible form to an intent analyst through an analyst user interface;

accept intent input from intent analyst through the analyst user interface, where the intent input characterizes the intent analyst's interpretation of the person's intent expressed in the utterance;

provide the data and the intent input to a training subsystem;

accept from the training subsystem training information generated responsive to the data and the intent input; and send the training information to a real-time recognition processor in order to improve performance thereof.

15. The system of claim 14, wherein the instructions further comprise instructions to accept intent input from a second intent analyst, wherein said instructions to provide are responsive to intent input from the intent analyst matching intent input from the second intent analyst.

16. The system of claim 14, wherein the training information is not generated in real-time by the training subsystem.

17. The system of claim 14, wherein the instructions further comprise instructions to send a second utterance to the real-time recognition processor responsive to performance of the real-time recognition processor exceeding a threshold quality level.

18. The system of claim 14, wherein the instructions further comprise instructions to automatically present the utterance in perceptible form to a second analyst and accept second intent input from the second analyst, wherein the intent input is selectively provided to the training subsystem responsive to the intent input matching the second intent input.

19. The system of claim 14, wherein the training subsystem comprises a plurality of non real-time ASRs, the training information being generated selectively upon concurrence of the non real-time ASRs.

20. The system of claim 14, wherein the training information comprises a statistical model corresponding to the utterance.

* * * * *